United States Patent
Bischel

(10) Patent No.: US 7,952,253 B2
(45) Date of Patent: May 31, 2011

(54) STATOR LAMINATIONS FOR ROTARY ACTUATOR

(75) Inventor: Kevin Allen Bischel, Algonquin, IL (US)

(73) Assignee: Woodward, Inc., Niles, IL (US)

( * ) Notice: Subject to any disclaimer, the term of this patent is extended or adjusted under 35 U.S.C. 154(b) by 273 days.

(21) Appl. No.: 11/861,147

(22) Filed: Sep. 25, 2007

(65) Prior Publication Data
US 2009/0058217 A1      Mar. 5, 2009

Related U.S. Application Data

(60) Provisional application No. 60/969,045, filed on Aug. 30, 2007.

(51) Int. Cl.
*H02K 1/16* (2006.01)
(52) U.S. Cl. ............................................... 310/216.057
(58) Field of Classification Search ........... 310/216.004, 310/216.011, 216.012, 216.016, 216.041, 310/216.055, 216.067, 54.17
See application file for complete search history.

(56) References Cited

U.S. PATENT DOCUMENTS

| | | | | |
|---|---|---|---|---|
| 3,564,314 A * | 2/1971 | Haydon | | 310/172 |
| 6,822,364 B2 * | 11/2004 | Suzuki et al. | | 310/216.012 |
| 6,836,051 B2 * | 12/2004 | Hiwaki et al. | | 310/254.1 |
| 7,038,343 B2 * | 5/2006 | Agnes et al. | | 310/154.03 |
| 7,045,918 B2 * | 5/2006 | Jonson | | 310/51 |
| 7,268,459 B2 * | 9/2007 | Baba et al. | | 310/216.067 |
| 7,363,696 B2 * | 4/2008 | Kimura et al. | | 29/596 |
| 7,466,055 B2 * | 12/2008 | Toide et al. | | 310/216.041 |
| 2007/0210669 A1 * | 9/2007 | Fukasaku et al. | | 310/217 |

FOREIGN PATENT DOCUMENTS
JP    02193545 A  *  7/1990
* cited by examiner

*Primary Examiner* — Tran N Nguyen
(74) *Attorney, Agent, or Firm* — Ziolkowski Patent Solutions Group, SC

(57) ABSTRACT

A rotary actuator includes an outer enclosure having an inner diameter surrounding a hollow interior. A stack of stator laminations, each having a stator diameter greater than the inner diameter of the outer enclosure when in an unflexed state, are also included in the rotary actuator. Each of the stator laminations is configured to flex into a shape so as to be positionable within the outer enclosure and substantially conform to the inner diameter. The stator lamination thus forms a line-to-line fit with at least a portion of the outer enclosure to form an interface having a desirable reluctance.

16 Claims, 5 Drawing Sheets

STATOR LAMINATIONS FOR ROTARY ACTUATOR

CROSS-REFERENCE TO RELATED APPLICATIONS

The present application is a non-provisional of, and claims priority to, provisional U.S. Patent Application No. 60/969,045, filed on Aug. 30, 2007.

BACKGROUND OF THE INVENTION

The present invention relates generally to electromagnetic actuators, and more particularly, to a stator lamination and outer housing of an actuator.

The desirability of and need for a rotary electromagnetic actuators has been recognized for years. A factor in the effectiveness of rotary electromagnetic actuators is the ability of the actuator to convert electromagnetic forces into useful output torque. That is, the efficiency of the actuator in converting electromagnetic forces into useful output torque is of primary importance. In some rotary actuator designs, a significant factor in this conversion is the presence of undesired air gaps in the actuator, and more specifically, the presence of air gaps between an outer enclosure and a stator in the actuator. For rotary actuators in which a magnetic flux path is formed by a rotor, a stator lamination stack, and an outer enclosure, such undesired air gaps greatly reduce the torque output of the actuator and lead to significant inefficiency in converting electromagnetic forces into useful output torque by creating undesirable reluctance. Useful output torque is maximized when the stator-armature gap provides a flux path having a minimal reluctance.

In an effort to minimize or eliminate this undesirable air gap, the interface between the stator lamination stack and an inner surface of the outer housing needs to be a precision line-to-line fit to eliminate a performance-reducing air gap. In an effort to form this line-to-line fit, current technology relies on a method to heat outer enclosure to expand its inner diameter in order to press the stator lamination into the enclosure. That is, the outer circular enclosure is heated to a desired temperature, and then the stator lamination stack is pressed into the outer enclosure. As the outer enclosure cools, it creates a press fit between the two parts. Such a process, however, is complex and costly, and additionally, may not always form an adequate line-to-line fit at desired locations in the actuator so as to form an efficient flux path.

In another commonly used method, the outer enclosure is made from sheet metal that is wrapped around the stator lamination stack. An additional adhesive may be employed to form a solid connection between the outer enclosure and the stator laminations to prevent unwanted rotation or axial translation therebetween. However, such an adhesive can function as an undesirable air gap and increase reluctance. Furthermore, application of the outer enclosure in such a manner results in a seam within the enclosure, which leaves the actuator unsealed.

Therefore, a need exists for a stator lamination design and method of positioning the stator lamination within an outer enclosure is efficient and cost effective. Additionally, it is desired that such a stator lamination design and construction method assures a line-to-line fit between the stator lamination stack and outer enclosure so as to eliminate a performance reducing air gap therebetween and form an efficient magnetic flux path.

BRIEF DESCRIPTION OF THE INVENTION

The present invention overcomes the aforementioned problems by providing a system and method of forming and positioning a stator lamination within an outer enclosure of a rotary actuator. A flexible stator lamination is designed to deform when pressure is applied thereto, thus allowing the stator lamination to be positioned within the outer enclosure.

In accordance with one aspect of the invention, a rotary actuator includes an outer enclosure having an inner diameter surrounding a hollow interior and a stack of stator laminations, with each of the stator laminations, when in an unflexed state, have a stator diameter greater than the inner diameter of the outer enclosure. Each of the stator laminations is configured to flex into a shape so as to be positionable within the outer enclosure and substantially conform to the inner diameter.

In accordance with another aspect of the invention, an electric motor includes a housing tube, a plurality of stator laminations positionable within an inner circumference of the housing tube when the plurality of stator laminations are in a compressed state, and a rotor positioned adjacent to the plurality of stator laminations and configured to rotate relative to the plurality of stator laminations. Each of the stator laminations has a first diameter that is greater than an inner diameter of the housing tube when in an uncompressed state.

In accordance with yet another aspect of the invention, a method for manufacturing a rotary actuator includes the step of constructing a plurality of elliptical stator laminations, with each of the elliptical stator laminations having a first diameter and a second diameter in an unflexed state and wherein the first diameter is greater than the second diameter. The method also includes the steps of constructing a tube shaped housing having a circular diameter less than the first diameter and greater than the second diameter and flexing the elliptical stator laminations to decrease a size of the first diameter such that it is less than the circular diameter. The method further includes the steps of positioning the flexed elliptical stator lamination within the tube shaped housing and forming a press fit between the elliptical stator lamination and the tube shaped housing at a plurality of pre-determined locations on the elliptical stator lamination.

Various other features and advantages of the present invention will be made apparent from the following detailed description and the drawings.

BRIEF DESCRIPTION OF THE DRAWINGS

The drawings illustrate embodiments presently contemplated for carrying out the invention.

In the drawings.

DETAILED DESCRIPTION OF THE PREFERRED EMBODIMENT

Figure 1:
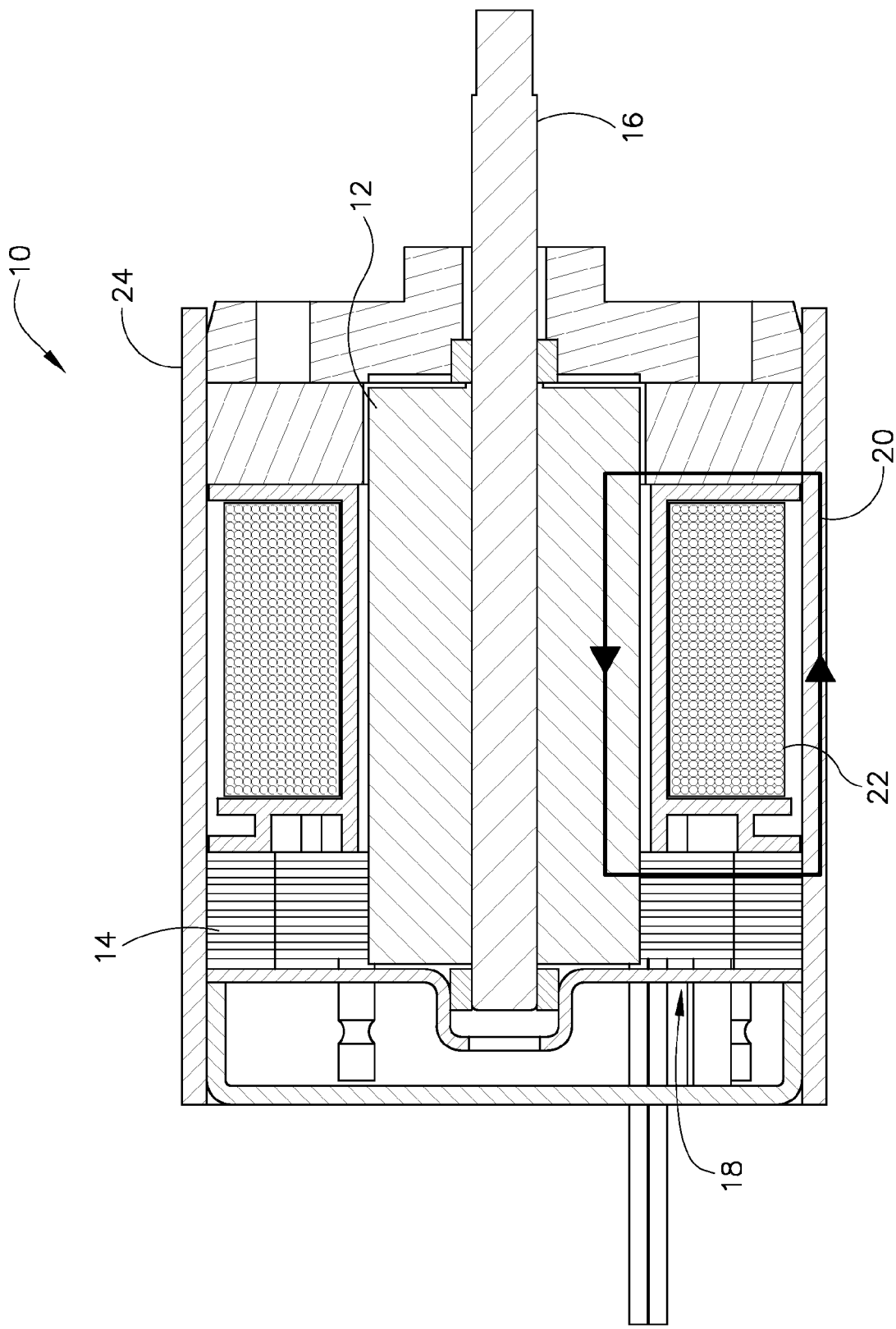
FIG. 1 is a cross-sectional view of a rotary actuator according to an embodiment of the present invention.

Referring to FIG. 1, an electromagnetic motor 10 is shown as an actuator of the "rotational" type, wherein a rotor 12 swings about an axis relative to a stator 14 as the excitation of an associated electromagnetic coil is varied. In the preferred embodiment, the rotary actuator 10 is illustrated as a limited angle torquer (LAT) which converts an input current to a proportionally related rotary output position of an output shaft 16. As its principal components, the actuator includes a stator assembly 16 associated with a rotor assembly 14 journaled or pivoted to swing about an axis relative to the stator 16, so that a working gap 18 is maintained between the two components to form part of a magnetic flux path 20. A coil assembly 22 is disposed within the rotary actuator 10 to create an excitation current. The excitation current creates a magnetomotive force (m.m.f.) to drive magnetic flux in the closed magnetic flux path 20 which includes the gap 18. Such magnetic flux attracts the rotor 14 toward the stator 16, according to well known principles of magnetism, and tends thus to urge the rotor either clockwise or counterclockwise to create a working torque output.

The rotary actuator 10 also includes an outer enclosure 24 (i.e., housing tube) having a hollow interior. The outer enclosure 24 houses the stator assembly 16 and rotor assembly 14 therein. Outer enclosure 24 is formed of a metallic material (e.g., steel) having a desirable magnetic reluctance value so as to form part of magnetic flux path 20. Outer enclosure 24 also functions to effectively seal off the stator assembly 14 and rotor assembly 14 from the ambient environment.

Figure 2:
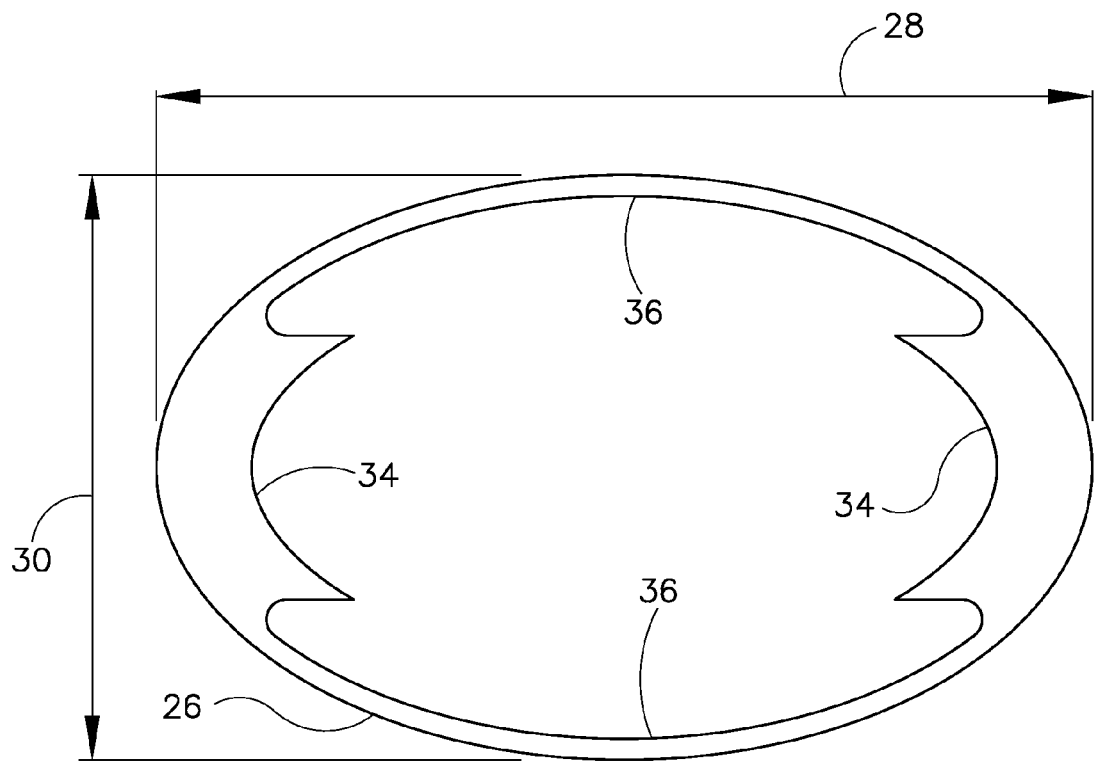
FIG. 2 is an end view of a stator lamination and outer enclosure useable with the rotary actuator of FIG. 1 according to one embodiment of the present invention.
Figure 2:
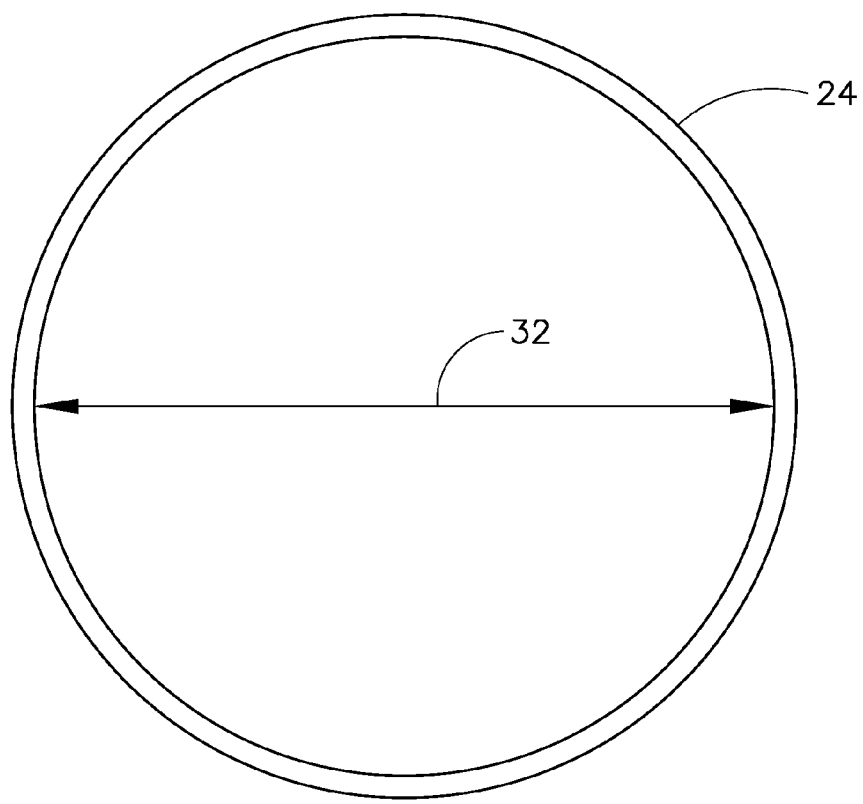

Referring now to FIG. 2, a stator lamination 26 is shown in an unflexed state and alongside outer enclosure 24. A plurality of stator laminations 26, in summation, form the stator assembly 16 of rotary actuator 10 (as shown in FIG. 1) when positioned within outer enclosure 24. As shown in FIG. 2, stator lamination 26 is of a generally elliptical or oblong shape. The stator lamination 26 thus is configured to have a first diameter 28 and a second diameter 30. In an unflexed state, first diameter 28 is greater than second diameter 30. In comparison to an inner circular diameter 32 of outer enclosure 24, first diameter 28 is larger than circular diameter 32 and second diameter 30 is less than circular diameter 32.

At the portions of stator lamination 26 that correspond to first diameter 28, pole faces 34 are formed on the stator lamination 26. At the portions of stator lamination 26 that correspond to second diameter 30, non-active faces 36 that are not part of a flux path between outer enclosure 24 and stator laminations 26 are formed thereon. The width of the stator lamination 26 at the non-active faces 36 in the direction of second diameter 30 is less than the thickness of the stator lamination 26 at the pole faces 34 in the direction of first diameter 28. As such, stator lamination 26 is constructed to flex and deform along the non-active faces 36, thus increasing a length of second diameter 30 and decreasing a length of first diameter 28.

Figure 3:
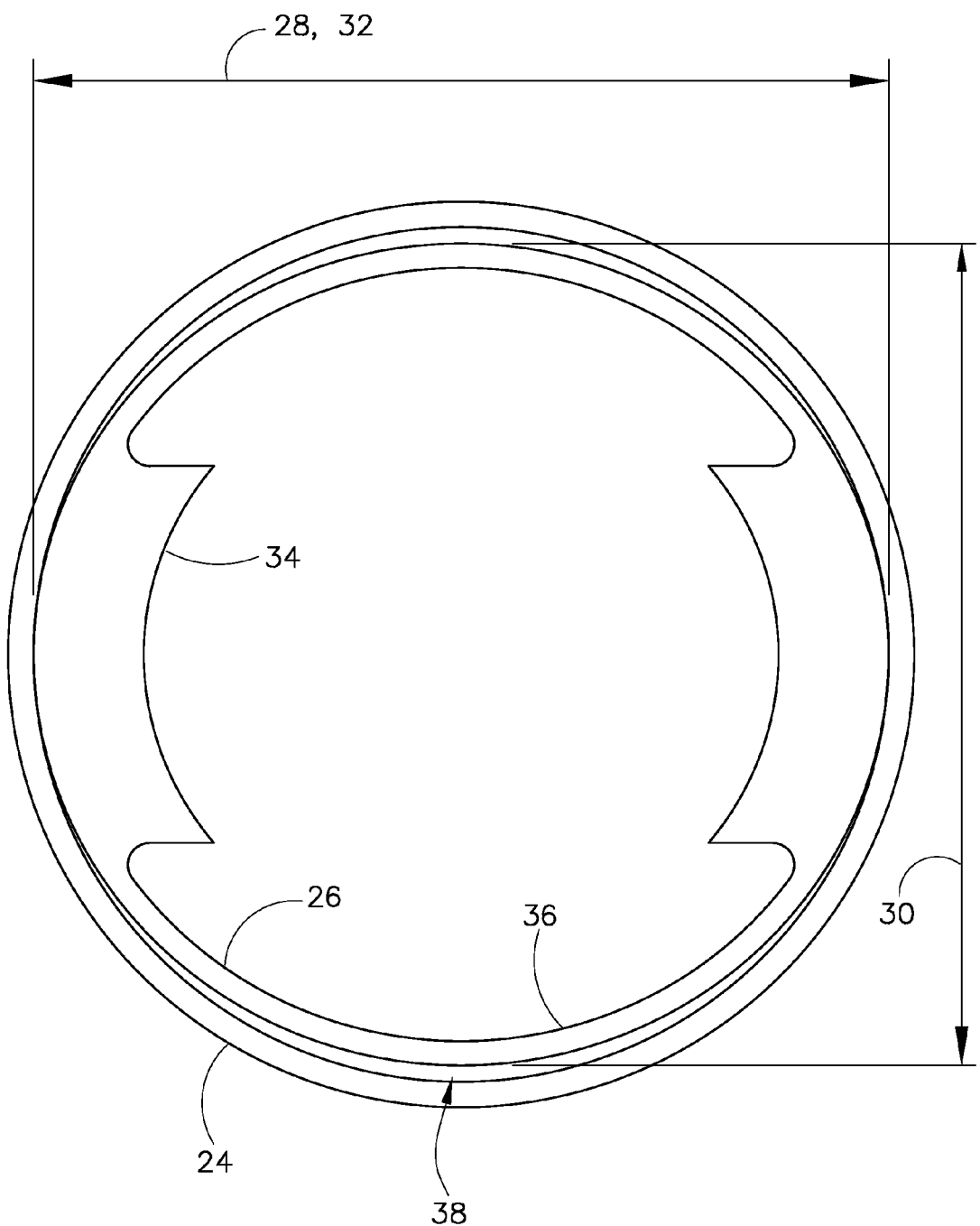
FIG. 3 is an end view of the stator lamination and outer enclosure of FIG. 2 with the stator lamination positioned within the outer enclosure.

Referring now to FIG. 3, stator lamination 26 is shown in a flexed state and positioned within outer enclosure 24. As a pressure is applied to opposite ends of stator lamination 26 at the pole faces 34, the length of first diameter 28 is decreased to a length less than or equal to that of circular diameter 32. The length of second diameter 30 is increased during such flexing, but the length of second diameter 30 remains less than the length of circular diameter 32, even when stator lamination 26 reaches a maximum flexed state. After stator lamination 26 has been flexed to a point at which each of the first and second diameters 28, 30 are less than or equal to circular diameter 32, stator lamination 26 is positioned within outer enclosure 24. Upon placement within outer enclosure 24, stator lamination 26 attempts to deform from its flexed state back to its original unflexed state, as is shown in FIG. 2. However, the dimensions of outer enclosure 24 (i.e., circular diameter 32) prevent stator laminations 26 from returning to this original, unflexed state. Thus, stator lamination 26 deforms to an intermediate state at which the stator lamination 26 conforms to outer enclosure 24 at a number of predetermined locations/points. That is, stator lamination 26 forms a line-to-line fit with outer enclosure 24 at each of the pole faces 34 on stator lamination 24. At the interface between the pole faces 34 and the outer enclosure 24, no air gap is present, thus providing for an improved flux path between the stator lamination 26 and the outer enclosure 24 as compared to if a void (i.e., undesired air gap) were present between the two components. In addition to eliminating the presence of an air gap, the line-to-line fit between stator lamination 26 and outer enclosure 24 also forms a press fit that prevents rotation and axial translation of stator lamination 26 relative to outer enclosure 24.

While a line-to-line fit between stator lamination 26 and outer enclosure 24 is formed at each of pole faces 34 in the intermediate state, non-active faces 36 remain spaced apart from outer enclosure 24. This spacing or presence of a void 38 between non-active faces 36 and outer enclosure 24 allows the stator lamination 26 to maintain a spring-like effect. That is, non-active faces 36 continue to apply an outward pressure directed toward pole faces 34 to form the press fit between pole faces 34 and outer enclosure 24. The desire of stator lamination 26 to return to its original size and shape generates a grip on the inner circular diameter 32 of outer enclosure 24 that holds the stator lamination 26 in place, thus eliminating any need for an additional adhesive or feature to prevent unwanted rotation or axial translation of the stator laminations 26.

The spring-like effect of stator lamination 26 between its flexed and unflexed states allows its oversized first diameter 28 to vary in size to closely fit the circular diameter 32 of outer enclosure 24 throughout the enclosure's tolerance range. That is, the pole faces 34 that form the critical flux path 20 (shown in FIG. 1) between stator lamination 26 and outer enclosure 24 are compressed to conform to the outer enclosure 24, regardless of a variation in the circular diameter 32 of outer enclosure 24. Thus, issues caused by imprecise tolerances of the outer enclosure circular diameter 32 can be prevented, as the spring-like effect of stator lamination 26 ensures a precise, line-to-line fit between the stator lamination 26 and the outer enclosure circular diameter 32.

Figure 4:
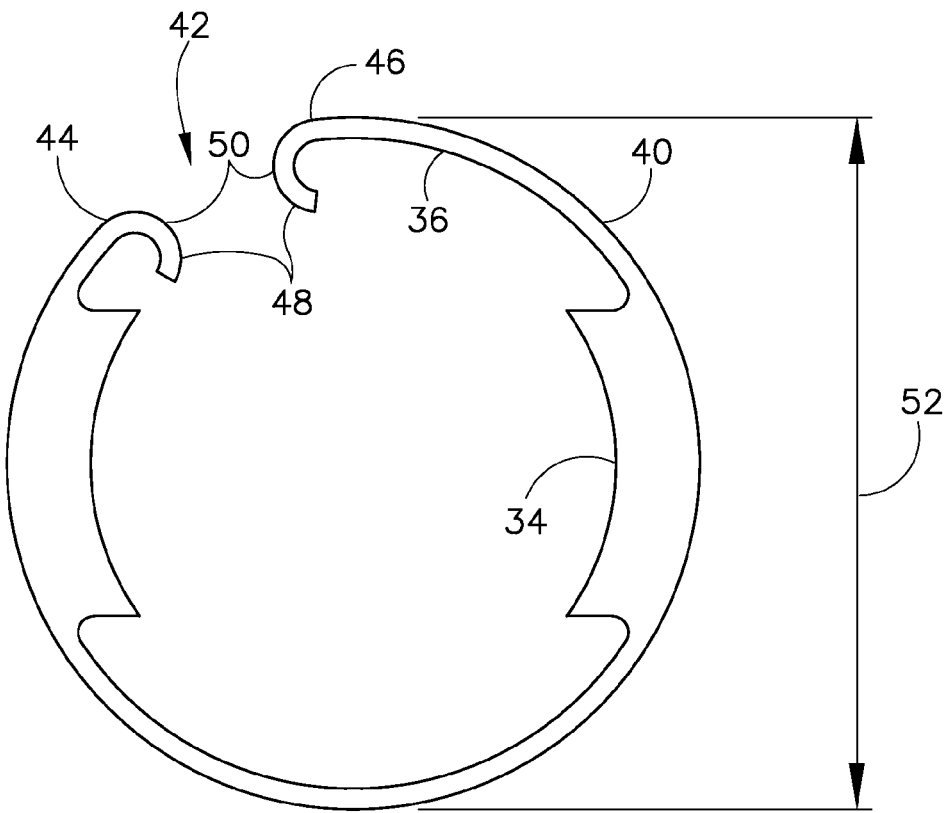
FIG. 4 is an end view of a stator lamination and outer enclosure useable with the rotary actuator of FIG. 1 according to another embodiment of the present invention.
Figure 4:
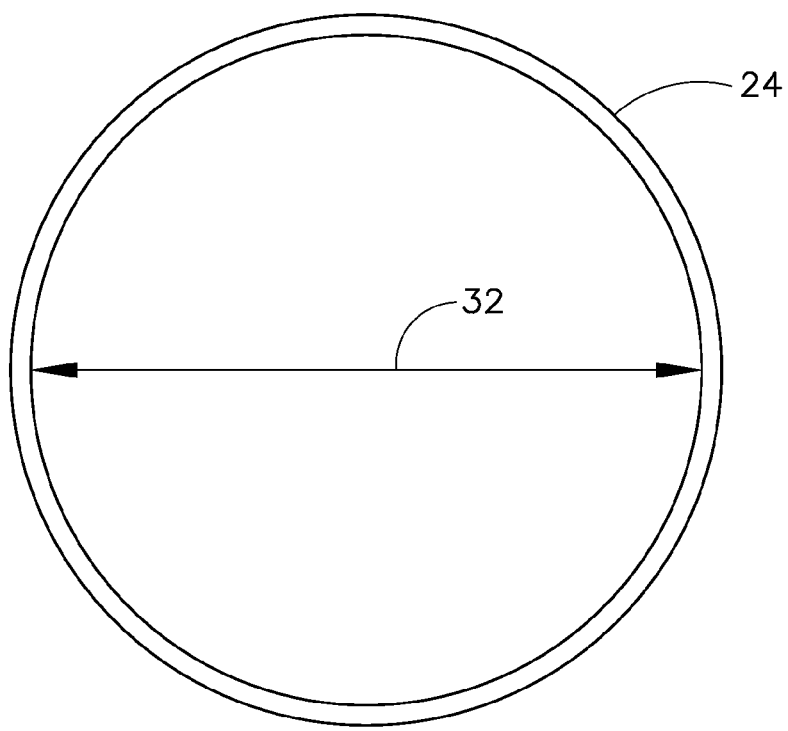

In another embodiment shown in FIG. 4, a stator lamination 40 is configured as a circular lamination having a break 42 therein. That is, circular lamination 40 has a first end 44 and second end 46 with a gap 42 formed therebetween. The gap 42 is formed so as to allow for a flexing of the circular lamination 40 when pressure is applied thereto. Hooks 48 are provided at each of the first and second ends 44, 46 to form an abutment surface 50 that prevents the first and second ends 44, 46 from sliding past one another when the circular lamination 40 is flexed.

As shown in FIG. 4, in an unflexed state, a circular or stator diameter 52 of stator lamination 40 is greater than the inner circular diameter 32 of outer enclosure 24. Thus, in order to position circular lamination 40 within outer enclosure 24, a pressure is applied to circular lamination 40 to decrease the size of the gap 42 between the first and second ends 44, 46 of the circular lamination. As the size of gap 42 is decreased, the size of the stator diameter 52 is also decreased. Thus, stator diameter 52 is variable depending on the state of flex of stator lamination 40.

Figure 5:
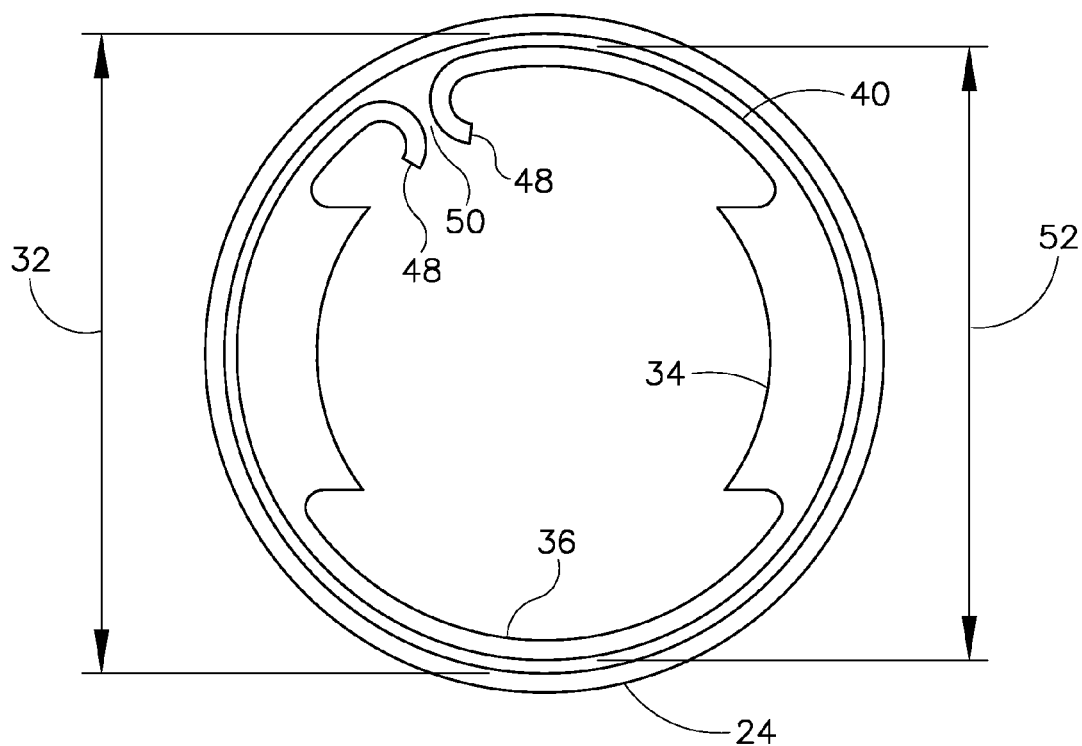
FIG. 5 is an end view of the stator lamination of FIG. 4 in a fully flexed or compressed state.

Referring now to FIG. 5, in a fully flexed state, where first and second ends 44, 46 of circular lamination abut one another on abutment surface 50, the stator diameter 52 is less than or equal to circular diameter 32 of outer enclosure 24 such that circular lamination 40 is configured for positioning within outer enclosure 24.

Figure 6:
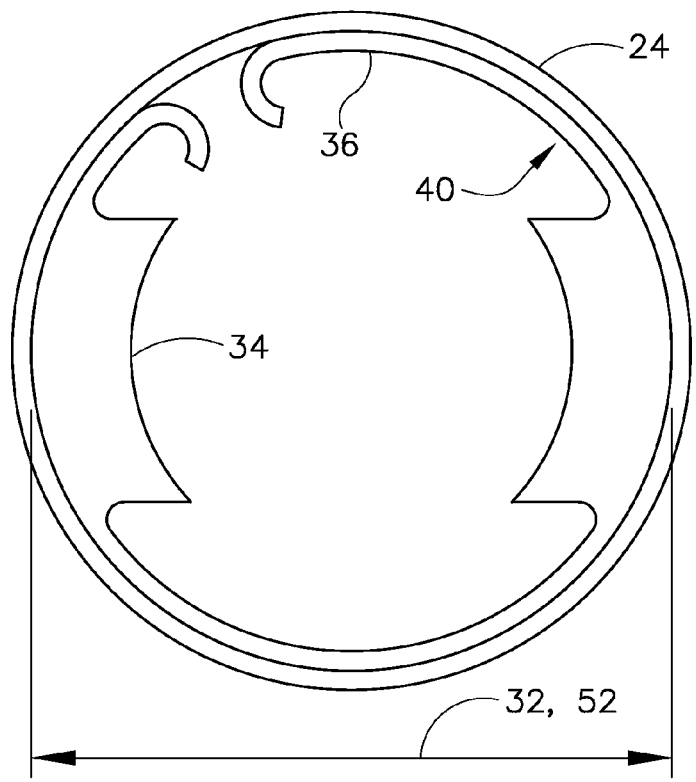
FIG. 6 is an end view of the stator lamination and outer enclosure of FIG. 4 with the stator lamination positioned within the outer enclosure.

As shown in FIG. 6, after positioning circular lamination 40 within outer enclosure 24, circular lamination 40 is allowed to deform from its maximum flexed state back toward its original unflexed state (shown in FIG. 4). As circular lamination 40 begins to conform to an inner circumference of outer enclosure 24, circular lamination 40 reaches an intermediate state that results in a stator diameter 52 between that of the diameter in the original unflexed state and that of the maximum flexed state. The force created by the desire of circular lamination 40 to return to its original unflexed state creates a press fit between the circular lamination 40 and the outer enclosure 24, thus preventing rotation and axial translation between the two components. As shown in FIG. 6, this spring-like force also assures the existence of a line-to-line fit between the circular lamination 40 and outer enclosure 24, which eliminates any undesired air gaps therebetween that could reduce performance of the rotary actuator 10 by increasing a reluctance in the critical flux path 20 (see FIG. 1).

Therefore, according to one embodiment of the present invention, a rotary actuator includes an outer enclosure having an inner diameter surrounding a hollow interior and a stack of stator laminations, with each of the stator laminations, when in an unflexed state, have a stator diameter greater than the inner diameter of the outer enclosure. Each of the stator laminations is configured to flex into a shape so as to be positionable within the outer enclosure and substantially conform to the inner diameter.

According to another embodiment of the present invention, an electric motor includes a housing tube, a plurality of stator laminations positionable within an inner circumference of the housing tube when the plurality of stator laminations are in a compressed state, and a rotor positioned adjacent to the plurality of stator laminations and configured to rotate relative to the plurality of stator laminations. Each of the stator laminations has a first diameter that is greater than an inner diameter of the housing tube when in an uncompressed state.

According to yet another embodiment of the present invention, a method for manufacturing a rotary actuator includes the step of constructing a plurality of elliptical stator laminations, with each of the elliptical stator laminations having a first diameter and a second diameter in an unflexed state and wherein the first diameter is greater than the second diameter. The method also includes the steps of constructing a tube shaped housing having a circular diameter less than the first diameter and greater than the second diameter and flexing the elliptical stator laminations to decrease a size of the first diameter such that it is less than the circular diameter. The method further includes the steps of positioning the flexed elliptical stator lamination within the tube shaped housing and forming a press fit between the elliptical stator lamination and the tube shaped housing at a plurality of pre-determined locations on the elliptical stator lamination.

The present invention has been described in terms of the preferred embodiment, and it is recognized that equivalents, alternatives, and modifications, aside from those expressly stated, are possible and within the scope of the appending claims.

What is claimed is:

1. A rotary actuator comprising:
    an outer enclosure having an inner diameter and surrounding a hollow interior;
    a stack of stator laminations, each of the stator laminations, when in an unflexed state, having a first stator diameter greater than the inner diameter of the outer enclosure and a second stator diameter less than the inner diameter of the outer enclosure, and wherein each of the stator laminations comprises a pair of pole faces oppositely positioned along the first diameter of the stator lamination; and
    wherein the stack of stator laminations is constructed to flex into a shape so as to be positionable within the outer enclosure and substantially conform to the outer enclosure when released.

2. The rotary actuator of claim 1 wherein the pole faces form a line-to-line fit with the outer enclosure when the stator lamination is flexed and positioned within the outer enclosure.

3. The rotary actuator of claim 2 wherein the line-to-line fit between the pole faces and the outer enclosure prevents rotation and axial translation therebetween.

4. The rotary actuator of claim 3 wherein the line-to-line fit between the pole faces and the outer enclosure forms a magnetic flux path.

5. The rotary actuator of claim 1 wherein each of the stator laminations comprises a pair of non-active faces, the non-active faces oppositely positioned along the second diameter of the stator lamination.

6. The rotary actuator of claim 5 wherein the non-active faces are spaced apart from the outer enclosure when the stator lamination is flexed and positioned within the outer enclosure.

7. The rotary actuator of claim 1 wherein each of the stator laminations is a circular lamination comprising a first end and a second end separated by a gap therebetween, the circular lamination being configured to flex so as to decrease a size of the gap between the first end and the second end.

8. The rotary actuator of claim 7 wherein each of the first and second ends further comprises a hook formed thereon to form an abutment surface.

9. The rotary actuator of claim 1 wherein the outer enclosure has a circular cross-section.

10. An electric motor comprising:
    a housing tube;
    a plurality of stator laminations positionable within an inner circumference of the housing tube when the plurality of stator laminations are in a compressed state;
    a rotor positioned adjacent to the plurality of stator laminations and configured to rotate relative to the plurality of stator laminations;
    wherein each of the stator laminations includes a first diameter greater than the inner diameter of the housing tube when in an uncompressed state; and
    wherein each of the stator laminations comprises a pair of pole faces located on the stator lamination opposite one another along the first diameter of the stator lamination.

11. The electric motor of claim 10 wherein each of the stator laminations includes a second diameter less than the inner diameter of the housing tube when in the uncompressed state.

12. The electric motor of claim 11 wherein the second diameter is further less than the inner diameter of the housing tube when the stator lamination is in the compressed state.

13. The electric motor of claim 10 wherein the pole faces form a press fit with the housing tube when the stator lamination is compressed within the housing tube.

14. The electric motor of claim 13 wherein the press fit provides an air-free interface between the stator lamination and the housing tube.

15. A rotary actuator comprising:
    an outer enclosure having an inner diameter and surrounding a hollow interior; and a stack of stator laminations, each of the stator laminations, when in an unflexed state, having a first stator diameter greater than the inner diameter of the outer enclosure and a second diameter less than the inner diameter of the outer enclosure, wherein each of the stator laminations includes a pair of pole faces oppositely positioned along the first diameter of the stator lamination;

wherein each of the stator laminations is configured to flex into a shape so as to be positionable within the outer enclosure and substantially conform to the outer enclosure 16. A rotary actuator comprising:

an outer enclosure having an inner diameter and surrounding a hollow interior;

a stack of stator laminations, each of the stator laminations, when in an unflexed state, having a first stator diameter greater than the inner diameter of the outer enclosure;

wherein each of the stator laminations is configured to flex into a shape so as to be positionable within the outer enclosure and substantially conform to the outer enclosure; and wherein each of the stator laminations is a circular lamination comprising a first end and a second end separated by a gap therebetween, the circular lamination being configured to flex so as to decrease a size of the gap between the first end and the second end.

* * * * *

UNITED STATES PATENT AND TRADEMARK OFFICE
CERTIFICATE OF CORRECTION

| | | |
|---|---|---|
| PATENT NO. | : 7,952,253 B2 | Page 1 of 1 |
| APPLICATION NO. | : 11/861147 | |
| DATED | : May 31, 2011 | |
| INVENTOR(S) | : Kevin Allen Bischel | |

It is certified that error appears in the above-identified patent and that said Letters Patent is hereby corrected as shown below:

Col. 2, line 49, delete "FIG. I" and
    substitute therefore -- FIG. 1 --; and

Col. 2, line 55, delete "FIG. I" and
    substitute therefore -- FIG. 1 --.

Col. 6, line 8 (Claim 1), delete "enclosureand" and
    substitute therefore -- enclosure and --; and Col. 6, line 63 (Claim 14), delete "air- free" and
    substitute therefore -- air-free --.

Signed and Sealed this
Sixteenth Day of August, 2011

David J. Kappos
*Director of the United States Patent and Trademark Office*